(12) United States Patent
Anderson et al.

(10) Patent No.: US 9,009,243 B2
(45) Date of Patent: Apr. 14, 2015

(54) TRACKING USAGE OF AND SHARING DATA BETWEEN MOBILE DEVICE APPLICATIONS

(71) Applicant: Viacom International Inc., New York, NY (US)

(72) Inventors: Anita Anderson, Emeryville, CA (US); Brian Jenkins, San Francisco, CA (US)

(73) Assignee: Defy Media, LLC, New York, NY (US)

( * ) Notice: Subject to any disclaimer, the term of this patent is extended or adjusted under 35 U.S.C. 154(b) by 324 days.

(21) Appl. No.: 13/630,775

(22) Filed: Sep. 28, 2012

(65) Prior Publication Data

US 2014/0095692 A1 Apr. 3, 2014

(51) Int. Cl.
| G06F 15/173 | (2006.01) |
| H04L 12/26 | (2006.01) |
| H04L 29/08 | (2006.01) |
| G06F 9/445 | (2006.01) |
| G06F 11/30 | (2006.01) |
| H04L 29/06 | (2006.01) |

(52) U.S. Cl.
CPC .............. *H04L 12/2602* (2013.01); *H04L 29/06* (2013.01); *H04L 29/08072* (2013.01); *H04L 67/22* (2013.01); *G06F 9/445* (2013.01); *G06F 11/3003* (2013.01); *G06F 11/3093* (2013.01); *G06F 2201/865* (2013.01)

(58) Field of Classification Search
CPC ......................... H04L 29/08072; H04L 29/06
USPC ................... 709/206, 216, 224, 229; 726/30
See application file for complete search history.

(56) References Cited

U.S. PATENT DOCUMENTS

| 8,793,809 | B2 * | 7/2014 | Falkenburg et al. | 726/30 |
| 8,825,838 | B2 * | 9/2014 | Suit | 709/224 |
| 8,832,219 | B2 * | 9/2014 | Morgan | 709/216 |
| 8,832,286 | B2 * | 9/2014 | Purpura | 709/229 |
| 8,838,717 | B2 * | 9/2014 | Westphal | 709/206 |
| 2013/0232207 | A1 * | 9/2013 | Westphal | 709/206 |

* cited by examiner

*Primary Examiner* — Khanh Dinh
(74) *Attorney, Agent, or Firm* — Chapin IP Law, LLC

(57) ABSTRACT

Described herein are methods and systems for tracking usage of and sharing data between mobile device applications. A mobile device receives a first application to be installed on the mobile device. The first application includes a first notification module, a content developer identifier, and a first application identifier. The mobile device receives a second application to be installed on the mobile device, the second application including a second notification module, the content developer identifier, and a second application identifier. The mobile device stores a mobile device identifier in a keychain area of the mobile device. The mobile device provides access to the keychain area for applications which include the content developer identifier. The mobile device retrieves the mobile device identifier from the keychain area for use by the first application and the second application.

26 Claims, 2 Drawing Sheets

TRACKING USAGE OF AND SHARING DATA BETWEEN MOBILE DEVICE APPLICATIONS

FIELD OF THE INVENTION

The subject matter of this application relates generally to methods and systems for tracking usage of and sharing data between mobile device applications.

BACKGROUND OF THE INVENTION

Mobile computing devices, such as smartphones and tablet computers, have become increasingly common tools for both entertainment and business productivity. These devices have seen an increase in their hardware processing power, which has contributed to their ability to execute robust applications while taking advantage of user interface feature set provided by the native operating system of the device. Such applications are generally developed, compiled and packaged in advance, and made available to consumers via an online marketplace such as an app store. Users can select applications for purchase and download them to the device.

Traditionally, application developers and producers have tracked the install base and usage of the applications via an identifier that is unique to a specific mobile device or hardware component. Examples of such identifiers include the Unique Device Identifier (UDID) assigned to devices like the iPhone and iPad from Apple Computer, Inc., the serial number assigned to various devices, or the Media Access Control (MAC) address assigned to certain networking interfaces found in mobile devices.

Consumer privacy concerns, however, have prompted hardware manufacturers and application providers to stop use of these unique identifiers for tracking device usage and for sharing data between applications installed on the device. Therefore, what is needed is a method and system for tracking usage of mobile device applications, and for sharing data between mobile device applications, that is independent of reliance on unique device identifiers like the UDID.

SUMMARY OF THE INVENTION

The techniques described herein provide a method and system for enabling application developers, producers, and distributors to track installation and usage of their applications on an individual mobile device without relying on a unique device identifier (e.g., UDID) and thereby compromising the user's privacy. The techniques also provide a method and system for enabling application developers, producers, and distributors to share data between their applications installed on a mobile device in the same fashion.

The invention, in one aspect, features a method for tracking usage of and sharing data between mobile device applications. A mobile device receives a first application to be installed on the mobile device. The first application includes a first notification module, a content developer identifier, and a first application identifier. The mobile device receives a second application to be installed on the mobile device, the second application including a second notification module, the content developer identifier, and a second application identifier. The mobile device stores a mobile device identifier in a keychain area of the mobile device. The mobile device provides access to the keychain area for applications which include the content developer identifier. The mobile device retrieves the mobile device identifier from the keychain area for use by the first application and the second application.

The invention, in another aspect, features a system for tracking usage of and sharing data between mobile device applications. The system includes a mobile device configured to receive a first application to be installed on the mobile device. The first application includes a first notification module, a content developer identifier, and a first application identifier. The mobile device is configured to receive a second application to be installed on the mobile device. The second application includes a second notification module, the content developer identifier, and a second application identifier. The mobile device is configured to store a mobile device identifier in a keychain area of the mobile device, provide access to the keychain area for applications which include the content developer identifier, and retrieve the mobile device identifier from the keychain area for use by the first application and the second application.

In some embodiments, any of the above aspects can include one or more of the following features. In some embodiments, the mobile device retrieves the mobile device identifier from the keychain area when the second application is installed and sends a message to a remote server when the second application is installed, the message including the second application identifier and the mobile device identifier. In some embodiments, the mobile device stores data associated with the first application in the keychain area and retrieves the stored data.

In some embodiments, the mobile device retrieves the mobile device identifier from the keychain when the first application is installed and sends a message to a remote server when the first application is installed, the message including the first application identifier and the mobile device identifier. The remote server registers the mobile device, including associating the mobile device identifier with the first application identifier.

In some embodiments, a notification module separate from the first application and the second application is installed on the mobile device. In some embodiments, the keychain area is a memory area on the mobile device that is accessible by the operating system of the mobile device. In some embodiments, the content provider identifier is a bundle seed ID.

In some embodiments, the first application and the second application store data in and retrieve data from the keychain area while disconnected from a network. In some embodiments, the first application and the second application store data in and retrieve data from the keychain area while connected to a network.

In some embodiments, the stored data excludes a MAC address of networking hardware integrated into the mobile device. In some embodiments, the stored data excludes personal information of a user associated with the mobile device. In some embodiments, the mobile device identifier is generated by the first application. In some embodiments, the mobile device identifier is generated by the second application if the second application is launched before the first application.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
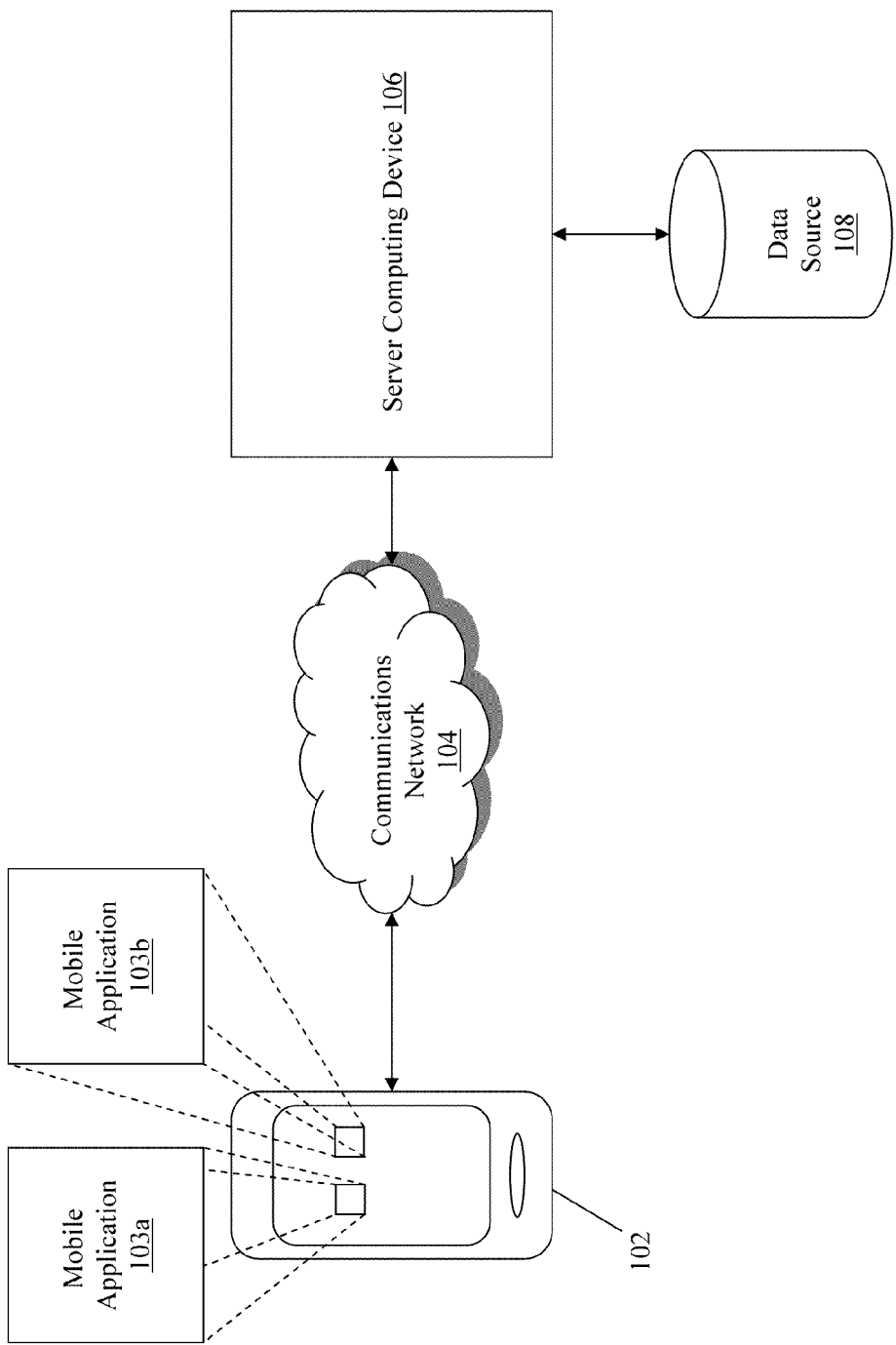
FIG. 1 is a block diagram of a system for tracking usage of and sharing data between mobile device applications.

FIG. 1 is a block diagram of a system 100 for tracking usage of and sharing data between mobile device applications. The system 100 includes a mobile computing device 102, a communications network 104, a server computing device 106, and a data source 108. The server 106 and the data source 108 can reside at the same physical location or may be dispersed to different physical locations. The server 106 and the data source 108 can be located on the same physical device, or the data source 108 can be distributed on different physical devices. The server 106 and the data source 108 can communicate via a communications network, for example the communications network 104. Although FIG. 1 depicts only a single mobile computing device 102, communications network 104, server computing device 106, and data source 108, the techniques described herein are not limited to this structure. Instead, this system 100 can include any of a number of configurations or components (e.g., multiple mobile computing devices, multiple servers) that do not depart from the scope and spirit of the invention.

The mobile computing device 102 communicates with the server computing device via the communications network 104. Example mobile computing devices 102 can include, but are not limited to a smart phone (e.g., Apple® iPhone®) or other mobile communications device, a portable video game system, a tablet computer, an internet appliance, a personal computer, or the like. In some examples, the mobile device 102 can be installed in a vehicle. The mobile device 102 can be configured to include an embedded digital camera apparatus. The mobile device 102 includes network-interface components to enable the user to connect to a communications network 104, such as the Internet, wireless network (e.g., GPRS, CDMA, RF), or the like.

The mobile device 102 also includes a storage module (e.g., NAND Flash memory) to store software and data on the device 102. Part of this storage module includes a keychain area traditionally used to store sensitive information, such as passwords, certificates, and keys. The keychain area is encrypted to prevent compromising the security of this information. The information stored in the keychain area by a particular software application is accessible by that application or by other applications with the same provisions (e.g., provisioning profile). Applications, such as first mobile application 103a and second mobile application 103b, can access the keychain area through use of application programming interface (API) libraries and/or calls. Although FIG. 1 depicts two mobile applications 103a-103b, it should be appreciated that this is one exemplary embodiment and the scope of the invention is not limited to two applications. The mobile device 102 can have any number of mobile applications that access the keychain area and use the techniques described herein to share data and communicate with remote computing devices.

Applications installed on the mobile device 102, such as first mobile application 103a and second mobile application 103b, are not limited in the types of information that can be stored in the keychain area. For example, a first application can store a data element, such as a device identifier or device token that is generated by the first application. The device identifier can uniquely identify the mobile device 102, and when the identifier is stored in the keychain area, other applications that share a provisioning profile with the first application can access the device identifier. In this manner, a content provider can use the device identifier to track installation and usage across a family of related applications without relying on certain pre-existing device hardware IDs (e.g., UDID, MAC address) that may give rise to privacy concerns.

The mobile applications 103a and 103b can also include code files and/or modules that act as an interface between the keychain area, the operating system of the mobile device 102, and the server computing device 106 for the purpose of managing the data stored in the keychain area. The code may take the form of a notification module imported into the mobile applications 103a and 103b that allows the applications 103a and 103b to perform tasks including, but not limited to: registration of the mobile device 102 with the server computing device 106, registration of the device 102 and/or applications 103a-103b with external services and relationships (e.g., Facebook, Gamecenter), receiving push notification messages from the server computing device 106, and storing and retrieving data from the keychain area. Other tasks and functions performed by the notification module can be contemplated without departing from the scope of the invention.

As described previously, the provisioning profile (e.g., Distribution Provisioning Profile used in conjunction with the Apple® Store) that is associated with the mobile applications 103a-103b determines which application(s) can access the same keychain area. The provisioning profile includes an application ID (also called an app ID) that identifies an application or set of applications from the same development source. The app ID is used to specify which applications are authorized to be signed and launched.

The app ID comprises two segments: a bundle seed ID (also called a team ID) and a bundle identifier. The bundle seed ID is a string of characters (e.g., letters and numbers) that uniquely identifies the development source of each application. Several applications can share the same bundle seed ID. The bundle identifier is a string appended to the bundle seed ID, and typically presented in a reverse-DNS format. The bundle identifier is used to identify a specific application. One example of an app ID is ABCDE12345.com.companyname.appname, where 'ABCDE12345' is the bundle seed ID and 'com.companyname.appname' is the bundle identifier. This is typically called an explicit app ID because it contains values for both the bundle seed ID and the bundle identifier.

In some embodiments, all or part of the bundle identifier can include an asterisk to denote a wildcard app ID. Using the above example, the app ID could be rewritten as ABCDE12345.* or ABCDE12345.com.companyname.*. The wildcard app ID can be used to use a single app ID to build and install multiple applications. However, the wildcard app ID typically cannot be used with applications that include services like GameCenter, iCloud, In-App Purchase, and the like.

Also, in order for an application to perform certain functions (e.g., issue push notifications) or have certain security permissions (e.g., accessing the keychain area), the application should be configured to include a set of entitlements. The entitlements confer the specific functions and security permissions that the application is allowed to perform. When creating a mobile application, the developer specifies the entitlement values for the functions and security permissions.

In some cases, the developer specifies the entitlement values through use of a property list (.plist) file. The .plist file is included with the application to which it pertains. The .plist file represents a hierarchy of objects that can be stored in the file system of the mobile device 102. The .plist file provides the application with a lightweight and portable way to store small amounts of data, and the application can later read the .plist file back into memory and recreate the original hierarchy of objects.

As mentioned previously, the .plist file can be used to allow an application to access the keychain area for storage of data, such as the device identifier or device token associated with the mobile device 102. An example .plist file to allow access to the keychain area for an iOS application on an iPhone® is set forth below:

```
<?xml version="1.0" encoding="UTF-8"?>
<!DOCTYPE plist PUBLIC "-//Apple//DTD PLIST 1.0//EN"
"http://www.apple.com/DTD">
<plist version="1.0">
<dict>
    <key>get-task-allow</key>
    <false/>
    <key>keychain-access-groups</key>
    <array>
        <string>ABCDE12345.com.companyname</string>
    </array>
</dict>
</plist>
```

The <string> field in the above example .plist file represents the app ID for the associated application. The application now has access to the keychain area and can store and retrieve data from the keychain area. In some embodiments, the application generates a unique device identifier (or device token) to identify the mobile device 102, and stores the device identifier in the keychain area for later retrieval and use. Other applications installed on the device 102 that share the same keychain area access (e.g., through use of a .plist file having entitlements for the same app ID) can also retrieve and store the device identifier in the keychain area. The applications that share the same keychain access can also store and retrieve other data from the keychain area without departing from the scope of the invention.

An advantage of using the above-described techniques is that the mobile device 102 is not required to have an active network connection in order for the applications 103a-103b to share data using the keychain area. The applications 103a-103b are not transmitting data to a remote computing device (e.g., server computing device 106) for storage but instead using the keychain area which is local to the device 102. Further, when generating the device identifier (or device token), the applications 103a-103b can use techniques to verify that the identifier is unique without having to connect to a remote computing device for confirmation.

Of course, the applications 103a-103b can communicate with the server computing device 106 for certain functions when the mobile device 102 has an active network connection. For example, the notification module of the first application 103a can communicate the generated device identifier to the server 106 for registration of the device 102 and association of the device 102 with the first application 103. The server 106 can store the device identifier and app ID in a database (e.g., data storage 108) to track installation of the first application 103a at the mobile device 102.

In addition, the first application 103a may include functionality to enable a user to install other applications (e.g., second application 103b) offered by the same developer. For example, the first application 103a can include a link to an online store to enable purchase and download of the second application 103b. As part of the purchase and download transaction, the notification module can send the device identifier and the app ID of the second application 103b to the server computing device 106. The server 106 can store the device identifier and app ID in data storage 108 to track installation of the second application 103b at the mobile device 102.

Figure 2:
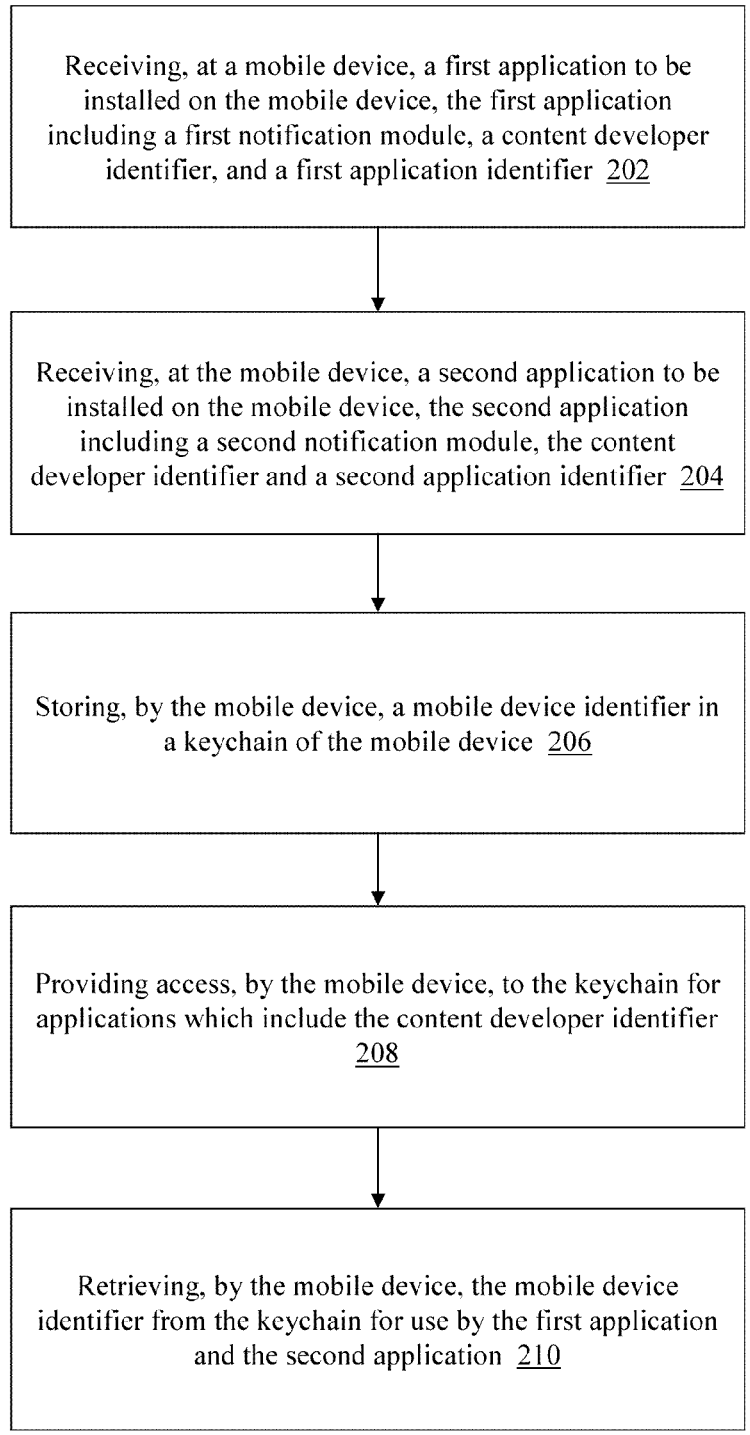
FIG. 2 is a flow diagram of a method for tracking usage of and sharing data between mobile device applications.

FIG. 2 is a flow diagram of a method for tracking usage of and sharing data between mobile device applications using the system 100 of FIG. 1. The mobile device 102 receives (202) a first application 103a to be installed on the device. The first application 103a includes a first notification module, a content developer identifier (such as the bundle seed ID) and a first application identifier (such as the bundle identifier). The mobile device 102 installs the first application 103a on the device.

The mobile device 102 receives (204) a second application 103b to be installed on the device. The second application 103b includes a second notification module, the content developer identifier (e.g., the same bundle seed ID as the first application 103a) and a second application identifier (e.g., a bundle identifier unique to the second application 103b). In some embodiments, the first application 103a and the second application 103b share a notification module that can be separately installed and configured on the mobile device 102.

The first and/or second applications 103a-103b generate a mobile device identifier. As explained previously, the mobile device identifier (or device token) uniquely identifies the mobile device, in a manner similar to the UDID or MAC address, but without using those identifiers to compromise a user's privacy and security. In some embodiments, the application that generates the mobile device identifier is the first application to be launched on the mobile device. For example, if the first application 103a and the second application 103b are both installed on mobile device 102, but the second application 103b is launched before the first application 103a, then the second application 103b generates the mobile device identifier.

The following code is an example of how the mobile device identifier generation can be accomplished:
CFUUIDRef theUUID=CFUUIDCreate(NULL);
CFStringRef uuidString=CFUUIDCreateString(NULL, theUUID);
CFRelease(theUUID);
return [(NSString *)uuidString autorelease];
The mobile device 102 stores (206) the mobile device identifier in a keychain area of the mobile device 102.

The mobile device 102 provides (208) access to the keychain area for applications that include the content developer identifier (e.g., the bundle seed ID), by analyzing the entitlements associated with the first application 103a and the second application 103b. As described above, the .plist file can include the app ID (e.g., bundle seed ID+bundle identifier), and the operating system of the mobile device 102 can reference the app ID to determine whether to allow an application to access the keychain area. Once the device 102 has determined whether an application is allowed to access the keychain area, the mobile device 102 retrieves (210) the mobile device identifier from the keychain area for use by the first application 103a and/or the second application 103b. As an example, the mobile device 102 analyzes the .plist file associated with the first application 103a upon receipt of a command to launch the first application 103a. The first application 103a then retrieves the mobile device identifier from the keychain area for use in executing the first application 103a (e.g., configuring push notifications associated with the first application 103a).

Another example of how the mobile device identifier can be used by the first application 103a and/or second application 103b is the in the context of multi-app reporting. For example, the user of the mobile device 102 may have installed the first application 103a and the second application 103b. The mobile device 102 can transmit the mobile device identifier and the application identifiers for the applications 103a and 103b to the server computing device 106 (e.g., as part of the registration process described above). The server computing device 106 can analyze the registered applications to determine trends and/or reports related to the data, such as users who install the first application 103a may be more likely to install another application (which may be the second application 103b). Other uses for tracking and analyzing the mobile device identifier and application identifiers can be envisioned without departing from the scope of the invention described herein.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for tracking usage of and sharing data between mobile device applications, the method comprising:
    receiving, at a mobile device, a first application to be installed on the mobile device, the first application including a first notification module, a content developer identifier, and a first application identifier;
    receiving, at the mobile device, a second application to be installed on the mobile device, the second application including a second notification module, the content developer identifier and a second application identifier;
    storing, by the mobile device, a mobile device identifier in a keychain area of the mobile device;
    providing access, by the mobile device, to the keychain area for applications which include the content developer identifier; and
    retrieving, by the mobile device, the mobile device identifier from the keychain area for use by the first application and the second application.

2. The method of claim 1, further comprising:
    retrieving, by the mobile device, the mobile device identifier from the keychain area when the second application is installed; and
    sending, by the mobile device, a message to a remote server when the second application is installed, the message including the second application identifier and the mobile device identifier.

3. The method of claim 1, further comprising:
    storing, by the mobile device, data associated with the first application in the keychain area; and
    retrieving, by the mobile device, the stored data.

4. The method of claim 1, further comprising:
    retrieving, by the mobile device, the mobile device identifier from the keychain area when the first application is installed;
    sending, by the mobile device, a message to a remote server when the first application is installed, the message including the first application identifier and the mobile device identifier; and
    registering, by the remote server, the mobile device, wherein registering includes associating the mobile device identifier with the first application identifier.

5. The method of claim 1, wherein a notification module separate from the first application and the second application is installed on the mobile device.

6. The method of claim 1, wherein the keychain area is a memory area on the mobile device that is accessible by the operating system of the mobile device.

7. The method of claim 1, wherein the content provider identifier is a bundle seed ID.

8. The method of claim 1, wherein the first application and the second application store data in and retrieve data from the keychain area while disconnected from a network.

9. The method of claim 1, wherein the first application and the second application store data in and retrieve data from the keychain area while connected to a network.

10. The method of claim 1, wherein the stored data excludes a MAC address of networking hardware integrated into the mobile device.

11. The method of claim 1, wherein the stored data excludes personal information of a user associated with the mobile device.

12. The method of claim 1, wherein the mobile device identifier is generated by the first application.

13. The method of claim 1, wherein the mobile device identifier is generated by the second application if the second application is launched before the first application.

14. A system for tracking usage of and sharing data between mobile device applications, the system comprising:
    a mobile device configured to:
        receive a first application to be installed on the mobile device, the first application including a first notification module, a content developer identifier, and a first application identifier;
        receive a second application to be installed on the mobile device, the second application including a second notification module, the content developer identifier and a second application identifier;
        store a mobile device identifier in a keychain area of the mobile device;
        provide access to the keychain area for applications which include the content developer identifier; and
        retrieve the mobile device identifier from the keychain area for use by the first application and the second application.

15. The system of claim 14, the mobile device further configured to:
    retrieve the mobile device identifier from the keychain area when the second application is installed; and
    send a message to a remote server when the second application is installed, the message including the second application identifier and the mobile device identifier.

16. The system of claim 14, the mobile device further configured to:
    store data associated with the first application in the keychain area; and
    retrieve the stored data.

17. The system of claim 14, the mobile device further configured to:
    retrieve the mobile device identifier from the keychain area when the first application is installed;
    send a message to a remote server when the first application is installed, the message including the first application identifier and the mobile device identifier,
    the remote server configured to register the mobile device, wherein registering includes associating the mobile device identifier with the first application identifier.

18. The system of claim 14, wherein a notification module separate from the first application and the second application is installed on the mobile device.

19. The system of claim 14, wherein the keychain area is a memory area on the mobile device that is accessible by the operating system of the mobile device.

20. The system of claim 14, wherein the content provider identifier is a bundle seed ID.

21. The system of claim 14, wherein the first application and the second application store data in and retrieve data from the keychain area while disconnected from a network.

22. The system of claim 14, wherein the first application and the second application store data in and retrieve data from the keychain area while connected to a network.

23. The system of claim 14, wherein the stored data excludes a MAC address of networking hardware integrated into the mobile device.

24. The system of claim 14, wherein the stored data excludes personal information of a user associated with the mobile device.

25. The system of claim 14, wherein the mobile device identifier is generated by the first application.

26. The system of claim 14, wherein the mobile device identifier is generated by the second application if the second application is launched before the first application.

\* \* \* \* \*